(12) United States Patent
Missotten et al.

(10) Patent No.: US 12,742,672 B2
(45) Date of Patent: Sep. 22, 2026

(54) SYSTEMS AND METHODS FOR UPDATING A CALIBRATION OF A HARVESTER FLOW RATE SENSOR DURING UNLOADING OF A CROP MATERIAL

(71) Applicants: CNH Industrial America LLC, New Holland, PA (US); CNH Industrial Belgium NV, Zedelgem (BE)

(72) Inventors: Bart M.A. Missotten, Herent (BE); Cory Douglas Hunt, Millersville, PA (US)

(73) Assignees: CNH Industrial America LLC, New Holland, PA (US); CNH Industrial Belgium NV, Zedelgem (BE)

( * ) Notice: Subject to any disclaimer, the term of this patent is extended or adjusted under 35 U.S.C. 154(b) by 736 days.

(21) Appl. No.: 18/099,717

(22) Filed: Jan. 20, 2023

(65) Prior Publication Data

US 2024/0247968 A1 Jul. 25, 2024

(51) Int. Cl.
*G01F 25/10* (2022.01)
*A01D 41/127* (2006.01)
(Continued)

(52) U.S. Cl.
CPC ......... *G01F 25/10* (2022.01); *A01D 41/1272* (2013.01); *A01D 90/10* (2013.01); *G01G 19/08* (2013.01)

(58) Field of Classification Search
CPC ..... G01F 25/10; A01D 41/1272; A01D 90/10; G01G 19/08
See application file for complete search history.

(56) References Cited

U.S. PATENT DOCUMENTS

| | | | | |
|---|---|---|---|---|
| 5,750,877 | A | 5/1998 | Behnke et al. | |
| 6,360,179 | B1 * | 3/2002 | Reep .................... | A01D 41/127 702/188 |

(Continued)

FOREIGN PATENT DOCUMENTS

| | | | |
|---|---|---|---|
| DE | 102015114569 | A1 | 3/2017 |
| EP | 1400161 | B1 | 8/2007 |
| EP | 3150048 | A1 | 4/2017 |

OTHER PUBLICATIONS

European Search Report issued in corresponding Application No. EP 24153011.2 Dated Jun. 24, 2024 (11 pages).

*Primary Examiner* — Yossef Korang-Beheshti
(74) *Attorney, Agent, or Firm* — Dority & Manning, P.A.

(57) ABSTRACT

In one aspect, the present subject matter is directed to a system for calibrating a harvester. The system includes a yield sensor configured to detect a flow of crop material discharged from the harvester and output data indicative of a flow rate of the crop material, and a wireless communication device configured to receive a transport vehicle communication from a transport vehicle. The transport vehicle communication includes a weight of a crop material in a transport receptacle. The system also includes a computing system in data communication with the wireless communication device. The computing system is configured to determine a time rate of change of the weight and is further configured to determine a yield sensor calibration update based on a time delay determination between the flow rate of the crop materials and the time rate of change of the weight.

17 Claims, 4 Drawing Sheets

(51) Int. Cl.
*A01D 90/10* (2006.01)
*G01G 19/08* (2006.01)

(56) References Cited

U.S. PATENT DOCUMENTS

| | | | | |
|---|---|---|---|---|
| 7,137,759 | B1 * | 11/2006 | Ambs .................... | B65G 37/00 406/89 |
| 8,695,396 | B2 | 4/2014 | Landphair et al. | |
| 8,749,628 | B2 | 6/2014 | Wuestefeld et al. | |
| 9,144,195 | B2 | 9/2015 | Koch et al. | |
| 9,686,913 | B2 | 6/2017 | Foster et al. | |
| 9,714,856 | B2 | 7/2017 | Myers | |
| 10,028,435 | B2 | 7/2018 | Anderson et al. | |
| 10,677,637 | B1 | 6/2020 | Von Muenster | |
| 2004/0050138 | A1 * | 3/2004 | Beck ....................... | G01F 25/10 73/1.16 |
| 2007/0185672 | A1 | 8/2007 | Anderson et al. | |
| 2012/0253611 | A1 * | 10/2012 | Zielke ................ | A01D 41/1275 701/50 |
| 2015/0219488 | A1 * | 8/2015 | Emerick ................ | G01G 17/00 177/1 |
| 2015/0377690 | A1 * | 12/2015 | Phelan ...................... | G01F 1/78 73/1.34 |
| 2016/0037720 | A1 * | 2/2016 | Koch ................. | A01D 41/1272 701/33.7 |
| 2016/0345485 | A1 | 12/2016 | Acheson et al. | |
| 2018/0122020 | A1 * | 5/2018 | Blank .................. | A01D 41/127 |
| 2018/0335335 | A1 * | 11/2018 | Bhavsar ................. | G01G 23/01 |
| 2021/0051849 | A1 | 2/2021 | Asebedo et al. | |
| 2023/0276735 | A1 | 9/2023 | Corban | |
| 2023/0306795 | A1 * | 9/2023 | Lechner ................. | G07C 5/008 |
| 2023/0329148 | A1 * | 10/2023 | Meier .................. | A01B 79/005 |
| 2024/0065156 | A1 * | 2/2024 | Woodcock ......... | A01D 41/1275 |

* cited by examiner

SYSTEMS AND METHODS FOR UPDATING A CALIBRATION OF A HARVESTER FLOW RATE SENSOR DURING UNLOADING OF A CROP MATERIAL

FIELD OF THE INVENTION

The present disclosure relates generally to harvesters capable of monitoring an unloading process of crop material to a transport vehicle and, more particularly, to systems and methods for calibrating a harvester flow rate sensor of the harvester.

BACKGROUND OF THE INVENTION

Harvesters or harvesting machines pick up crop material, treat the crop material, e.g., remove any undesirable portions or residue, and discharge the crop material. Harvesters can discharge the crop material, either continuously as with a forage harvester or after intermediate storage as with a combine harvester, to a transport or transfer vehicle. The transport vehicle may be a tractor or truck pulling a cart, wagon, or trailer, or a truck or other vehicle capable of transporting harvested crop material. The harvested crop material is loaded into the transport vehicle via a crop discharging or unloading device, such as a spout or discharge auger, associated with the harvester.

During the performance of an unloading operation from a harvester to a transport vehicle, the flow rate of the crop material discharged through the spout can be monitored and used to estimate a crop yield. Flow rate sensors, also referred to as yield sensors, can be used to generate a measure of flow rate, but such sensors suffer from errors caused by drifting or otherwise erroneous and out of date sensor calibrations.

Accordingly, systems and methods for updating calibration values that address one or more of the issues present in the prior art would be welcomed in the technology, including, for example, systems and methods that provide a simpler (e.g., including less resource intensive) and/or more cost-effective means for updating calibration values for yield sensors used within harvesters.

SUMMARY OF THE INVENTION

Aspects and advantages of the technology will be set forth in part in the following description, or may be obvious from the description, or may be learned through practice of the technology.

In one aspect, the present subject matter is directed to a system for calibrating a harvester. The system includes a yield sensor configured to detect a flow of crop material discharged from the harvester and output data indicative of a flow rate of the crop material, and a wireless communication device configured to receive a transport vehicle communication from a transport vehicle. The transport vehicle communication includes a weight of a crop material in a transport receptacle. The system also includes a computing system in data communication with the wireless communication device. The computing system is configured to determine a time rate of change of the weight and is further configured to determine a yield sensor calibration update based on a time delay determination between the flow rate of the crop materials and the time rate of change of the weight.

In another aspect, the present subject matter is directed to a harvesting system. The harvesting system includes a harvester structured to discharge a flow of harvested crop material through an unloading device. The harvesting system also includes a yield sensor provided in association with the harvester and in flow communication with the flow of harvested crop material. The yield sensor configured to generate data indicative of a flow rate of the flow of harvested crop material discharged from the harvester. In addition, the harvesting system includes a wireless communication device configured to receive a transport vehicle communication from a transport vehicle. The transport vehicle communication including a weight of a crop material in a transport receptacle. The harvesting system also includes a computing system in data communication with the wireless communication device. The computing system is configured to determine a yield sensor calibration update based on a steady state time window of the flow rate of the harvested crop material and the weight of the crop material in the transport receptacle.

In a further aspect, the present subject matter is directed to a method for calibrating a harvester. The method includes harvesting a crop material with the harvester and unloading the harvested crop material from the harvester to a transport receptacle separate from the harvester. In addition, the method includes receiving, with a computing system, flow rate data indicative of a flow rate of harvested crop material from the harvester. The method also includes receiving, with the computing system, weight data indicative of a weight of the harvested crop material in the transport receptacle. The method further includes calculating a yield sensor calibration update based upon data derived from a steady state time window of the flow rate of the harvested crop material and a time rate of change of weight of the crop material in the transport receptacle.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
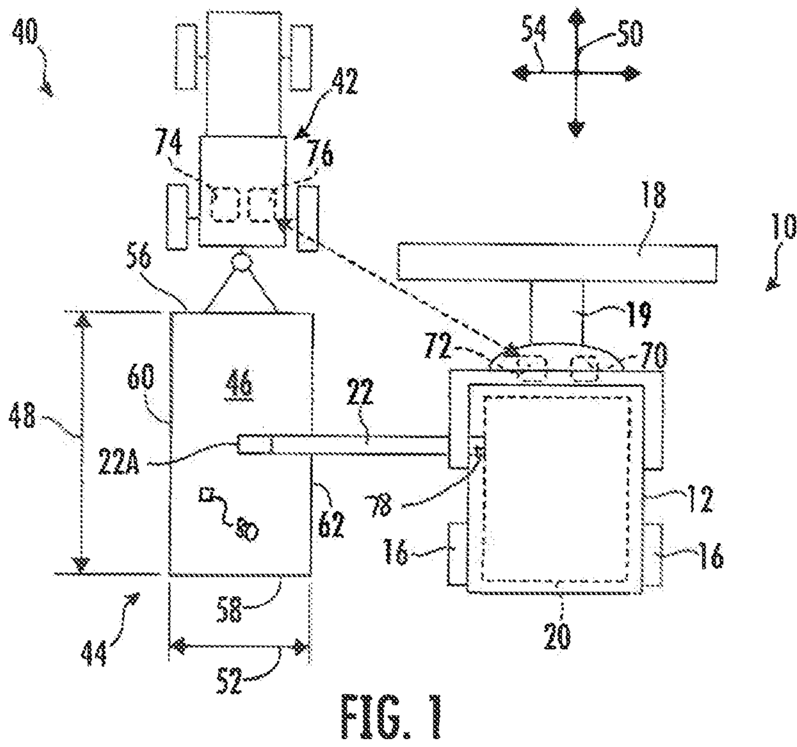
FIG. 1 illustrates a schematic top view of one embodiment of a harvester and a transport vehicle during an unloading operation in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to systems and methods for updating a calibration of a flow rate sensor associated with a harvester during unloading of a crop material from the harvester. The flow sensor can take a variety of physical forms useful in generating an estimate of flow rate of a crop material, but in general such flow sensors generate a sensor output representative of the flow rate of a crop material being unloaded from the harvester. In several embodiments, the system may be capable of receiving data generated from a weight sensor associated with a transport vehicle into which the crop material is being unloaded. Data derived from the weight can be used in conjunction with the flow rate to aid in calibrating the yield sensor.

In accordance with aspects of the present subject matter, the system may include the ability to receive data from the yield sensor associated with the harvester and receive data from a weight sensor associated with the transport vehicle. A time rate of change of weight can be calculated and compared to the flow rate data to identify a time difference between when a flow rate is sensed by passage of crop material through the flow rate sensor and when the crop material arrives at the transport vehicle to be weighed. The calculated time rate of change of the weight and/or the measured flow rate can be monitored to establish a steady state condition in which crop material inflowing to the harvester matches a rate of crop material being unloaded from the harvester. The steady state condition permits the identification of a start time over which the time rate of change of weight and the flow rate can be evaluated. A stop time for the window can be established based on satisfying a criteria, or an operator input. Upon identifying a steady state window, a calibration update can be calculated based on a ratio of an integration of the flow rate and an integration of the time rate of change of weight.

Figure 2:
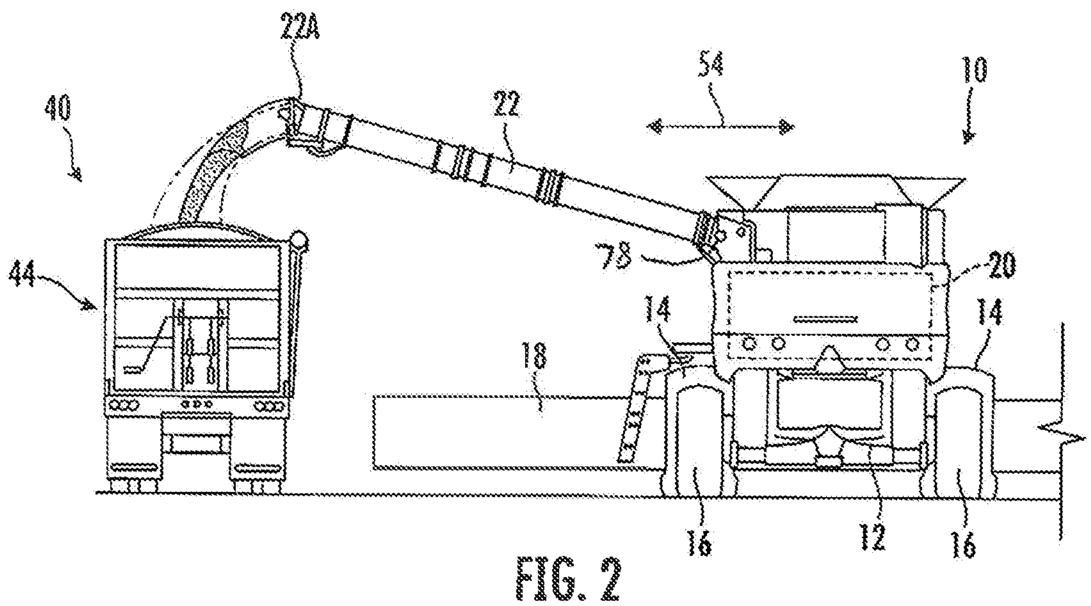
FIG. 2 illustrates a rear view of one embodiment of a harvester and a transport vehicle during an unloading operation in accordance with aspects of the present subject matter.

Referring now to FIGS. 1 and 2, respective top and rear views of a harvester 10 and a transport vehicle 40 during the performance of an unloading operation is illustrated in accordance with aspects of the present subject matter. As is generally understood, during a harvesting operation, crops harvested by the harvester 10 can be off-loaded immediately (e.g., in the case of forage harvesters) or temporarily stored within internal storage of the harvester (e.g., in the case of combine harvesters). Regardless, either immediately upon harvesting or after the internal storage is full or substantially full, an unloading operation is performed during which the harvested crops are unloaded from the harvester 10 to a transport vehicle 40. Such an unloading operation can be performed while the vehicles 10, 40 are stationary or can be performed "on-the-go" simultaneously with the performance of a harvesting operation. For instance, for on-the-go unloading operations, the transport vehicle 40 is typically brought into alignment with the harvester 10 such that the harvested crops can be unloaded from the harvester 10 while both vehicles 10, 40 are moving through the field. Such alignment typically includes maintaining desired offset distances between the harvester 10 and the transfer vehicle 40 (e.g., a desired lateral offset distance and/or a desired longitudinal offset distance) to ensure that the harvested crops can be properly unloaded from the harvester 10 and received by the transport vehicle 40.

In the illustrated embodiment, the harvester 10 is configured as a combine, such as an axial-flow type combine or any other suitable type of combine. In such an embodiment, the harvester 10 may include, for example, a chassis 12 and a plurality of ground engaging elements (e.g., front and rear wheels 14, 16) supporting the chassis 12 relative to the ground. In addition, the harvester 10 may include various components coupled to or supported by the chassis 12, including, but not limited to, a header 18, a feeder housing 19, an operator's cab (not shown), various internal crop processing systems and/or sub-systems (e.g., a threshing and separating system, a cleaning system, and/or the like), an internal crop storage tank 20, and an unloading device, such as an unloading tube or spout 22. The unloading spout 22 may, for example, be configured as an unloading auger, belt conveyor, chain elevator, and/or the like. Regardless of the type, the unloading spout 22 is generally configured to facilitate the transfer of harvested crops from the internal crop storage tank 20 to the transport vehicle 40 during the performance of an unloading operation. In other embodiments, it should be appreciated that the harvester 10 may have any other suitable harvester configuration, such as by being configured as a forage harvester.

In general, the transport vehicle 40 may include both a traction device 42 and a crop transport receptacle 44. As shown in the illustrated embodiment, the traction device 42 corresponds to a work vehicle, namely an agricultural tractor. However, in other embodiments, the traction device 42 may be a truck or other self-propelled vehicle sufficient to carry or tow the transport receptacle 44. Similarly, in the illustrated embodiment, the crop transport receptacle 44 corresponds to a wagon. However, in other embodiments, the transport receptacle 44 may be a grain cart, bin, or other similar storage/transport receptacle. In another embodiment, the transport vehicle 40 may be a semi-trailer truck, tractor-trailer or other similar self-propelled container vehicle.

As particularly shown in FIG. 1, the crop transport receptacle 44 may generally be configured to define a storage volume 46 for receiving/storing harvested crops. For instance, in the illustrated embodiment, the storage volume 46 has a length 48 extending in a longitudinal direction 50 between opposed front and rear walls 56, 58 of the transport receptacle 44 and a width 52 extending in a lateral direction 54 between opposed first and second sidewalls 60, 62 of the transport receptacle 44. During the performance of an unloading operation, the transport vehicle 40 is generally configured to be aligned relative to the harvester 10 such that harvested crops contained within the internal storage tank 20 of the harvester 10 can be directed through the unloading spout 22 and expelled therefrom into the storage volume 46 of the crop transport receptacle 44. Specifically, a discharge end 22A of the unloading spout 22 may generally be aligned with the transport receptacle 44 in the longitudinal and lateral directions 50, 54 such that harvested crops expelled from the spout 22 are received within the storage volume 46 of the receptacle 44. In this regard, to maintain the desired relative positioning between the discharge end 22A of the unloading spout 22 and the transport receptacle 44 during an on-the-go unloading operations, various aspects of the operation of one or both of the vehicles 10, 40 can be manually or automatically controlled/adjusted, such as by adjusting the speed and/or steering of the harvester 10 and/or the transport vehicle 40. In addition, the unloading spout 22 can be actuated to adjust the position/orientation of the spout 22 relative to the transport receptacle 44, such as by actuating the spout 22 to adjust the longitudinal position of the discharge end 22A relative to the front and rear walls 56, 58 of the receptacle 44 and/or to adjust the lateral position of the discharge end 22A relative to the first and second sidewalls 60, 62 of the receptacle 44.

Additionally, in several embodiments, both the harvester 10 and the transport vehicle 40 may include on-board computing systems and associated wireless communications devices. For instance, as shown in FIG. 1, the harvester 10 may include a harvester-based computing system 70 and wireless communications device 72, while the transport vehicle 40 may include a transport-based computing system 74 and wireless communications device 76. In such embodiments, the vehicles 10, 40 may be equipped for vehicle-to-vehicle communications, for example, by allowing data, including information, requests, instructions, control signals, and/or the like, to be transmitted between the on-board computing systems 70, 74 via the associated wireless communications devices 72, 76. As will be described below; such communication of data may, for instance, correspond to sensor data associated with the flow rate of crop material from the harvester 10, as well as data associated with the weight of crop material in the transport receptacle 44.

As also depicted in FIG. 1, the harvester 10 includes a yield sensor 78 in operative association with a flow of crop material from the harvester 10 and into the unloading spout 22 prior to being deposited into the transport vehicle 40. The yield sensor 78 is structured to generate data indicative of a flow rate of the crop material being discharged from the harvester 10. In one embodiment the yield sensor 78 is positioned at the discharge end of an elevator within the harvester 10 prior to entry into an auger that conveys the grain toward the transport vehicle 40 through the unloading spout 22. In such an embodiment, the yield sensor 78 can detect grain discharged from the elevator and flung toward a calibrated impact plate, where the flow rate is calculated based upon the period and strength of pulses as the crop material impacts the calibrated impact plate. It will be appreciated that the flow rate of the crop material is a calculated rate. Other placements and configurations of the yield sensor 78 are contemplated in which such sensors can calculate and/or directly measure a flow rate of crop material from the harvester 40 toward the transport vehicle 40. Accordingly, the output of the yield sensor 78 can include raw data (e.g., voltages associated with impact of grain upon the calibrated impact plate) or calculated data. Furthermore, the output can include any value useful to convey information related to a flow rate of grain, expressed in whatever units (e.g., mass flow and/or weight flow) and format (e.g., raw and/or calculated) are desirable in any given application. The output of the yield sensor 78 can furthermore include an associated time that the data is being output from the sensor 78, but in other embodiments a time stamp may be applied when the data output from the yield sensor 78 is received by another system.

The yield sensor 78 is in data communication with the harvester-based computing system 70 through wired or wireless communications. For example, in one form, the harvester 10 may include an on-board data bus capable of conveying information between one or more sensors and one or more computing systems, including the harvester-based computing system 70. Data from the yield sensor 78 can be sampled and communicated to the harvester-based computing system 70 at a variety of rates.

The yield sensor 78 can have an associated calibration value used by the harvester-based computing system 70 to adjust and improve the quality of the flow rate generated by the yield sensor 78. For example, in some applications, a flow rate generated from the yield sensor 78 may be impacted by the age of equipment, harvesting conditions, environmental conditions, etc. A calibration value can be applied to flow rate data generated by the yield sensor 78 to improve its accuracy in light of the various factors impacting its performance. In embodiments discussed further below; the calibration value applied to data derived by the yield sensor 78 can be updated as a result of select measurement and computations of crop material being transferred from the harvester 10 to the transport vehicle 40.

Also depicted in FIG. 1, the transport vehicle 40 includes a weight sensor 80 in operative association with the storage volume 46 of the transport vehicle 40. The weight sensor 80 is structured to determine a weight of the crop material deposited into the transport vehicle 40 from the harvester 10. In one embodiment, the weight sensor 80 is positioned at a bottom of the storage volume 46. In such an embodiment, the storage volume 46 may be supported by the weight sensor 80 such that, when crop material is received into the storage volume 46, the weight sensor 80 can detect an increase in the weight of the crop material. In such an embodiment, the weight sensor 80 can take the form of a load cell configured to react to an applied force, such as weight of the crop material in the storage volume 46. In some forms, multiple weight sensors 80 can be present to provide for redundancy or increased accuracy of a weight determination relative to just a single weight sensor 80. Other placements and configurations of the weight sensor 80 are contemplated in which such sensors can calculate and/or directly measure a weight of crop material present in the storage volume 46 of the transport vehicle 40. Accordingly, the output of the weight sensor 78 can include raw data (e.g., voltages associated with the weight of harvested materials upon the load cell) or a calculated data. Furthermore, the output can include any value useful to convey information related to a weight of harvested materials, expressed in whatever units (e.g., mass and/or weight) and format (e.g., raw and/or calculated) are desirable in any given application. The output of the weight sensor 80 can furthermore include an associated time that the data is being output from the sensor 80, but in other embodiments a time stamp may be applied when the data output from the weight sensor 80 is received by another system (e.g., received by any of the harvester-based computing system and/or the transport-based computing system 74).

The weight sensor 80 is in data communication with the transport-based computing system 74 through wired or wireless communications. For example, in one form, the transport vehicle 40 may include an on-board data bus capable of conveying information between one or more sensors and one or more computing systems, including the transport-based computing system 74. Data from the weight sensor 80 can be sampled and communicated to the transport-based computing system 74 at a variety of rates.

Figure 3:
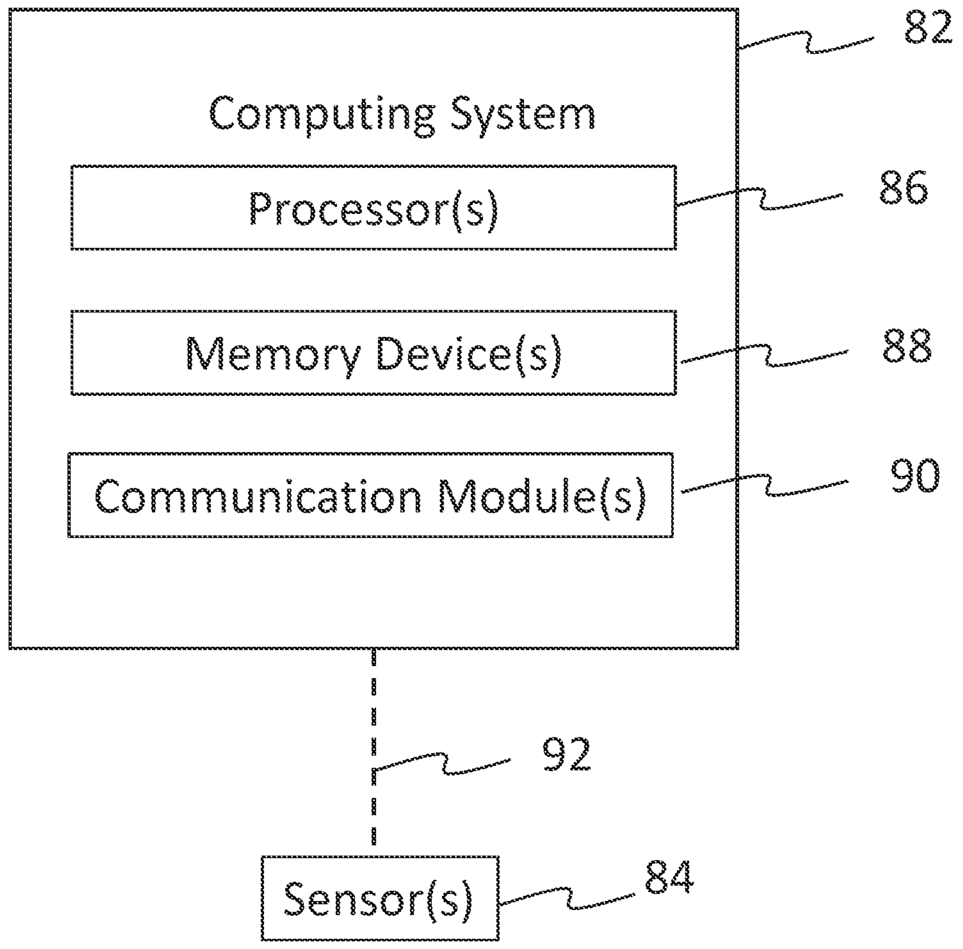
FIG. 3 illustrates a schematic view of one embodiment of a computing system for communicating with a sensor in accordance with aspects of the present subject matter.

Referring now to FIG. 3, embodiments of the systems and methods disclosed herein may include a computing system 82 communicatively coupled to each sensor 84. The computing system 82 depicted in FIG. 3 can be the harvester-based computing system 70 and/or the transport-based computing system 74 described and depicted above.

Furthermore, the sensor 84 can be an associated yield sensor 78 and/or weight sensor 80 described and depicted above. Thus, any reference herein with respect to the computing system 82 can apply to either, or both, of the harvester-based computing system 70 and the transport-based computing system 74. Further, any reference herein with respect to the sensor 84 can apply to either, or both, of the yield sensor 78 and weight sensor 80.

In general, the computing system 82 may include suitable algorithms, mathematical formulas or expressions, predetermination relationships, correlation tables, look-up tables, and/or other data stored within its memory that allows the computing system 82 to determine, calculate, or estimate any data associated with calibrating the flow rate of crop material from the harvester 10 through a comparison driven from data derived from the yield sensor 78 and weight sensor 80.

In general, the computing system 82 may comprise any suitable processor-based device known in the art, such as a computing device or any suitable combination of computing devices. Thus, in several embodiments, the computing system 82 may include one or more processor(s) 86 and associated memory device(s) 88 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 88 of the computing system 82 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 88 may generally be configured to store suitable computer-readable instructions that, when implemented by the processor(s) 86, configure the computing system 82 to perform various computer-implemented functions, such as one or more aspects of the methods or algorithms described herein. In addition, the computing system 82 may also include various other suitable components, such as a communications circuit or module, one or more input/output channels, a data/control bus and/or the like. For instance, the computing system 82 may include a communications module or interface 90 to allow the computing system 82 to communicate with any of the various other system components described herein, such as the sensor(s) 84. Specifically, as shown schematically in FIG. 3, the communications module 90 may be communicatively coupled to each sensor 84 via one or more communicative links 92 to allow data to be transmitted from the sensors 84 to the computing system 82.

It should be appreciated that, in several embodiments, the computing system 82 may correspond to a stand-alone computing system separate and apart from the computing systems 70,74. In such embodiments, the computing system 82 may, for instance, be configured to communicate data related to the weight of the transport receptacle 44 to one or more separate computing systems, such as by communicating the data to the on-board computing system of an associated transport vehicle and/or harvester (e.g., on-board computing systems 70, 74 shown in FIG. 1). Additionally, in some embodiments, the computing system 82 may correspond to or form part of an existing on-board computing system, such as the on-board computing system of an associated transport vehicle (e.g., computing system 74 (FIG. 1)).

Figure 4:
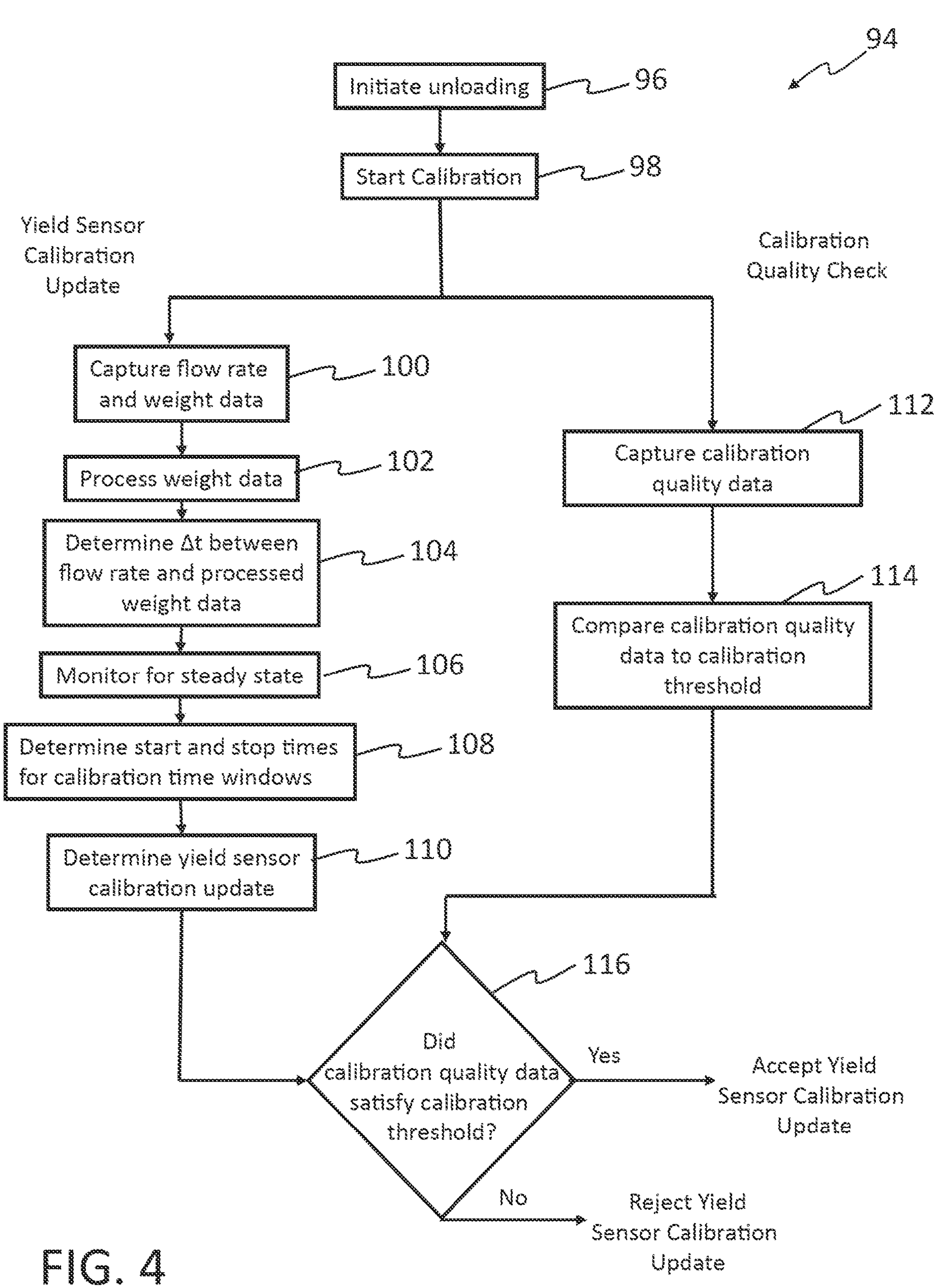
FIG. 4 illustrates a flow chart used for determining a yield sensor calibration update as well as performing a calibration quality check in accordance with aspect of the present subject matter.

Turning now to FIG. 4, a process 94 is depicted in which data is collected and processed to determine a yield sensor calibration update, and whether the yield sensor calibration update is to be used with the yield sensor 78 or rejected. The process 94 can be performed on one or more computing systems 82, including but not limited to the harvester-based computing system 70. During on-the-go unloading operations, an operator of the harvester 10 can initiate an unloading of crop material at 96. Such initiation can be commanded, via an unload initiated command, by the operator through any appropriate selection of an operation, either through a display in the cab of the harvester 10, or any other suitable switch/button/etc. In some forms the unload initiated command can be determined by the harvester-based computing system 70 either in response to an indication from the operator or through other automatic sensing (e.g., if an unloading process is occurring). Once initiated, the computing system 82 receives the command to initiate the unloading of crop material and performs actions commensurate with such command, such as powering all appropriate subsystems to enable to transfer of crop material from the harvester 10 to the transport vehicle 40. Subsystems can include internal crop elevator to raise the crop material to an auger that conveys the crop material through the spout 22. The computing system 82 also starts a calibration at 98 which includes at least two parts, a yield sensor calibration update illustrated on the left side of FIG. 4, and a calibration quality check illustrated on the right side of FIG. 4. The results of both of those two parts are compared at the end of the calibration process and which is depicted at the bottom of FIG. 4. Additional and/or fewer steps outlined in FIG. 4 are contemplated. Furthermore, the steps outlined in FIG. 4 need not be strictly performed in the order indicated as will be apparent from the description below.

During the yield sensor calibration update depicted on the left side of FIG. 4, the computing system 82 is configured at 100 to capture data from the yield sensor 78 and weight sensor 80. Capturing data from either of the sensors 78,80 can include communicating through the communication link 92 and/or wireless communication devices 72 and/or 76. In one embodiment in which the harvester-based computing system 70 is the computing system 82, the harvester-based computing system 70 may request, via the wireless communication device 72, weight data from the transport-based computing system 74. The remainder of the discussion that follows will use the harvester-based computing system 70 as the computing system 82 for ease of description in determining the yield sensor calibration update, but it will be appreciated that other computing systems 82 can be used to implement the process depicted in FIG. 4.

Some of the discussion below refers to "flow rate" from the yield sensor 78, but it will be appreciated that the yield sensor 78 is capable of producing data representative of the flow rate. For example, although flow rate can be expressed and output in values associated with units such as kg/sec, or lb./min, etc., it will be appreciated given the discussion above that the yield sensor 78 can also output a value, such as voltage, which is still representative of flow rate. Thus, the discussion below referring to "flow rate" is understood to represent all expressions of the flow rate, be it a numerical equivalent to a flow rate (e.g., expressed in, say, kg/sec) or a voltage representative of flow rate.

The transport-based computing system 74 can respond to the request for weight data with real-time data collection and/or can archive, and then send, weight data as a single data file or chunks of a data file. If the weight data provided from the transport-based computing system 74 does not include an associated time for each frame of the weight data, the harvester-based computing system 70 can provide an associated time of arrival of any given frame of the weight data. The 'time' provided can be a universal time, a time measured from the start of a process, such as at step 100, or any other suitable time value. In some embodiments, the transport-based computing system 74 may broadcast, via the wireless communication device 76, weight data from the weight sensor 80 without need of receiving a request from the harvester-based computing system 70. Such transmissions may be broadcast continuously by the wireless communication device 76 or upon initiation by an operator of the transport vehicle 40.

The transport-based computing system 74 may also request and/or collect flow rate data associated with a flow of crop material provided by the yield sensor 78 via the communication link 92. If the flow rate data provided from the yield sensor 78 does not include an associated time for each frame of the flow rate data, the transport-based computing system 74 can provide an associated time of arrival of any given frame of the flow rate data. The 'time' provided can be a universal time, a time measured from the start of a process, such as at 100, or any other suitable time value. With the collection of both weight data and flow rate data, and associated times, other process steps can be initiated.

At step 102, the weight data collected from the weight sensor 80 and transmitted by wireless communication device 76 can be processed. For example, the weight data can, in some embodiments, be numerically smoothed through a smoothing function to facilitate subsequent processing. Such smoothing can include de-spiking of the data to remove spurious weight readings that may be an artifact of a noisy sensor or wireless transmission artifacts. Such de-spiking can include processing the data through a moving average and/or eliminating a spurious data point and replacing it with an average of its neighbors. Other techniques may also be employed. Additionally and/or alternatively, the weight data can be smoothed by using a low-pass filter applied to the data. Once the weight data is smoothed, a time-based differentiation is applied to the smoothed weight data to provide a time rate of change weight of the crop material in the transport vehicle 40. Time-based differentiation can take the form of a calculated change between each frame of data, divided by the time span over which the frames of data are collected, to determine a time rate of change between the frames. Other derivative techniques can also be used. In some forms, the weight data may not need to be smoothed, in which case the time-based differentiation can be applied directly to the weight data provided to the harvester-based computing system 70. In some alternative embodiments, the smoothing and/or time-based differentiation can be performed by the transport vehicle 40, such as in the transport-based computing system 74 and provided via the wireless communication device 76 to the harvester-based computing system 70. In such embodiments, the weight data provided to the harvester-based computing system 70 can include the time-based differentiation of weight.

Other processing can also be done on the weight data to provide correction or adjustment as suggested above. In embodiments in which multiple weight sensors 80 are used, one or more of the weight sensors can be a dummy load cell used to provide a reference measure for other load cells. Such techniques can be useful in adjusting a weight data that is incurred as a result of accelerations sensed by the weight sensor 80 as the transport vehicle 40 moves along uneven ground. Alternatively and/or additionally, an inertial measuring unit or accelerometer can also be used in conjunction with the transport vehicle 40 to determine accelerations and adjust weight determined by the weight sensor 80. The processing of weight data to adjust a value based upon vehicle movements, either through a dummy weight sensor and/or an inertial measurement unit or accelerometer, can be performed before or after any smoothing and/or differentiation discussed above.

At step 104, a time delay, or Δt, can be determined between the time rate of change weight derived from data provided from the weight sensor and the flow rate provided from the yield sensor 78. As will be appreciated, the time delay between the time rate of change of weight on the one hand and flow rate on the other is due in part to several factors. For example, the yield sensor 78 measures flow rate of crop material at a location that experiences the flow well before the crop material is received by the transport vehicle 40. In addition, signal processing (e.g., low-pass filtering, averaging, etc.) can induce delays in a calculated signal relative to its actual occurrence. The time delay between the rate of change of weight and the flow rate can be determined by comparing the signals to one another and matching similarities. Such matching of similarities can be accomplished by time shifting either of the rate of change of weight or the flow rate relative to each other to find the time shift that provides minimal differences. Such time shift needed to align the two signals in time is the time delay. For example, cross correlations can be determined for various time delays to determine the appropriate delay. As another non-limiting example, an optimization can be performed using a cost index to quantify a difference between the two signals to find the appropriate time shift needed to align the signals to one another.

At step 106, the harvester-based computing system 70 can examine the flow rate data and the time rate of change of weight data to determine when the unloading process has reached a steady state. It will be appreciated that at the beginning of an unloading process the harvester 10 may have collected a sizeable quantity of crop material in its tank. During the initial phase of the unloading process, the flow rate sensor may detect sizeable variations in flow rate. In the later phase of the unloading process, the tank in the harvester 10 may become depleted such that inflow of crop material being harvested equals the outflow of crop material from the harvester 10. Such a period can be monitored and identified by the harvester-based computing system 70, whether such monitoring is based on data reduction of the flow rate from the yield sensor 78 or time rate of change of the weight from the weight sensor 80, or a pre-set time based upon previously identified flow characteristics (e.g., a pre-set time after a peak flow rate is detected). An example of data reduction applied to the flow rate or to the time rate of change of the weight includes comparing either or both against an associated threshold. If, for example, the flow rate from the yield sensor 78 remains within a flow rate threshold for a given amount of time then a steady state can be declared for the flow rate. Likewise, if the time rate of change of weight derived from the weight sensor 80 remains within a time rate of change of weight threshold for a given amount of time, then a steady state can be declared for the time rate of change of weight. Either or both of the thresholds for time rate of change of weight and for flow rate can be expressed as a relative threshold for a given amount of time from a current value of the time rate of change of weight and flow rate. To use flow rate as an example, at any given point in time, if the flow rate for the preceding 10 seconds (or other appropriate dwell time) is within +/− of a percentage threshold (e.g., +/−3%, but other values are also contemplated), then a steady state condition can be declared. The start of the steady state window can either be at the beginning of the time window for assessing a steady state condition or can be at the time that the determination is made. In other forms, the threshold can be an absolute value. For example, if the flow rate for a given crop material at a steady state condition is known, the value for the known steady state can be used and a comparison over a time period can be made to determine whether the flow rate is within a band that uses absolute values of the stead state condition. Whether relative or absolute, the threshold for the flow rate on the one hand and the threshold for the time rate of change of weight can be the same or different in any given embodiment. In some embodiments, it may only be necessary to determine steady state for one of the flow rate or time rate of change of weight and then use the time difference, $\Delta t$, determined above to declare the other in steady state.

At step 108, the harvester-based computing system 70 can determine both start and stop times used to define the steady state window, or, in other words, a calibration interval for purposes of calculating the sensor calibration update. In some embodiments the time period over which to capture data at steady state can be set by a pre-determined timer, the expiration of which ends the steady state data collection period. In other embodiments, the time period over which to capture data at steady state can be selected by the operator in advance or in real time as conditions warrant. Such selection in real time could be, for example, implemented through a button/switch/etc. in the cab that permits an operator to halt the collection of data at steady state in preparation for determination of the sensor calibration update. No matter how long the time period extends for steady state data collection, or the manner in which the time period is ended, it will be appreciated that the harvester-based computing system 70 can set a start time and an end time for each of the flow rate and time rate of change of weight.

At step 110, the yield sensor calibration update is determined based upon data derived from the steady state time window of each of the flow rate and the time rate of change of weight. Each of the flow rate and the time rate of change of weight can be integrated (e.g., numerically integrated) to calculate a total accumulated weight for each of the variables over the stead state period. The ratio of the total accumulated weight of the integrated flow rate and the total accumulated weight of the integrated time rate of change of weight can be used to set the yield sensor calibration update. In one embodiment in which the flow rate is expressed as a Voltage, the ratio of total accumulated weight of the time rate of change of the weight can be divided by the total accumulated weight of the flow rate (i.e., in this instance the total accumulated weight of the flow rate is total accumulated Voltages expressed as Volt*sec) to yield a yield sensor calibration update. Such an update can be used directly in the harvester-based computing system 70 to replace an existing calibration value. In other embodiments the yield sensor calibration update can be a weighted correction value which is multiplied by an existing yield sensor calibration value. Whether the yield sensor calibration update is a direct replacement or a weighted value to be applied to an existing calibration value, it will be appreciated that such a calibration is ready for application in the harvester-based computing system 70.

During the calibration quality check depicted on the right side of FIG. 4, the harvester-based computing system 70 is configured at 112 to capture calibration quality data which can be used by the harvester-based computing system 70 to determine whether to apply the yield sensor calibration update. Data can be captured from any variety of sensor, from any variety of computing device, and from any variety of sources. For example, data on the track of the harvester 10 and/or transport vehicle 40 can be provided from an on-board GPS available to the harvester-based transport vehicle 70. Such track information can be useful to determine if the harvester 10 traversed the headland during the offloading process. The track information coupled with time can also be used to determine if the harvester 10 and/or transport vehicle 40 were subject to one or more stop-and-go events. The harvester may also have a slope sensor useful to determine the contour of the terrain over which the harvester 10 is traversing. Such information can also be made available to the harvester-based computing system 70. The harvester 10 may also measure humidity or moisture content of the crop material such as through an on-board sensor or through aid of a cellular connection. The operator of the harvester 10 can also select the type of crop material being harvested and/or the condition in which it is being harvested.

At step 114, the harvester-based computing system compares the calibration quality data against an associated calibration quality check threshold to determine whether to accept the yield sensor calibration update. Examples of data evaluated by the harvester-based computing system 70 include: whether the harvester 10 and/or transport vehicle 40 is on a slope, a so called uphill/downhill check; whether the humidity is within range, also called a humidity check: whether the crop material being harvested is satisfactory, also called a crop type check: whether the flow rate of the crop material is within expected bounds, also called a flow rate check; whether the harvester 10 and/or transport vehicle 40 have performed a smooth enough operation, also referred to as a stop and go frequency check: whether the harvester 10 and/or transport vehicle 40 are subject to make a turn in the headlands, also referred to as a headland turn check: and/or whether the time difference, $\Delta t$, discussed above is within an expected value, also referred to as a time delay check. The various checks are performed against threshold values. In some forms, the calibration quality check thresholds are a bounded threshold, in other instances the calibration quality check thresholds can be either a minimum threshold or a maximum threshold. Whether the calibration quality check threshold includes upper/lower bounds, a lower threshold, or a maximum threshold, the step at 114 compares the calibration quality data against its associated calibration quality check threshold. If the calibration quality check threshold is satisfied (e.g., the calibration quality data is within the threshold(s)), then the harvester-based computing system 70 determines that the calibration quality data satisfied all associated calibration quality check thresholds. Additionally, in some embodiments, as a final quality check, the harvester-based computing system 70 can query the operator of the harvester 40 to confirm that the calibration quality thresholds are satisfied.

Whether the calibration quality check is performed automatically by the harvester-based computing system 70 or, in some embodiments, relies upon operator acceptance to a query to accept the yield sensor calibration, the harvester-based computing system 70 proceeds to step 116. If the calibration quality data satisfied all associated calibration quality check thresholds, then the harvester-based computing system 70 accepts the yield sensor calibration update and applies the update. If the calibration quality data failed one or more associated calibration quality check thresholds (e.g., the calibration quality data is outside of the threshold(s)), then the harvester-based computing system 70 rejects the yield sensor calibration update and retains the existing calibration unmodified. In some embodiments, the operator may be given a readout of all comparisons of quality check data and calibration quality check thresholds, and can then elect to accept or reject the yield sensor calibration update as needed.

Figure 5:
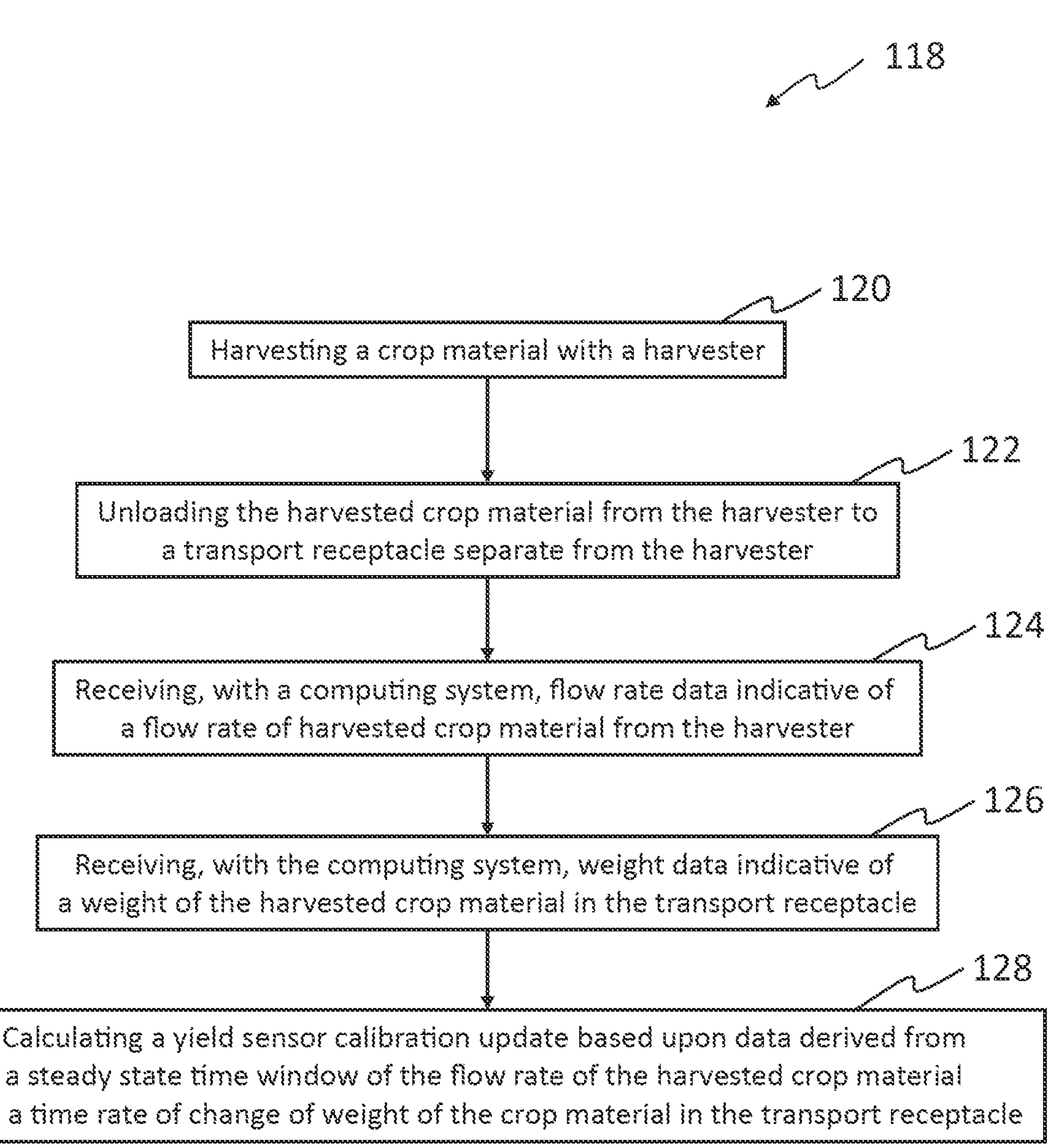
FIG. 5 illustrates a flow diagram of one embodiment of a method for updating calibration values for a yield sensor in accordance with aspects of the present subject matter.

Referring now to FIG. 5, a flow diagram of one embodiment of a method 118 for calculating a yield sensor update is illustrated in accordance with aspects of the present subject matter. In general, the method 200 will be described herein with reference to the features described above with reference to FIGS. 1-4. However, it should be appreciated by those of ordinary skill in the art that the disclosed method 118 may generally be utilized in association with harvesters 10 and/or with systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at step 120, the method 118 may include harvesting a crop material with the harvester 10. The method 118 may also include at 122 unloading the harvested crop material from the harvester 10 to a transport receptacle 44 separate from the harvester 10. The method 118 may also include receiving, with a computing system 82, flow rate data indicative of a flow rate of harvested crop material from the harvester 10. The flow rate data can be generated from a yield sensor 78 as indicated above. The method 118 may also include receiving, with the computing system 82, weight data indicative of a weight of the harvested crop material in the transport receptacle 44. As indicated above, the weight data can be generated from a weight sensor 80. The method may also include calculating a yield sensor calibration update based upon data derived from a steady state time window of the flow rate of the harvested crop material and a time rate of change of weight of the crop material in the transport receptacle 44.

It is to be understood that the steps of the method 118 are performed by the computing system 82 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 82 described herein, such as the method 118, is implemented in software code or instructions which are tangibly stored on a tangible computer readable medium. The computing system 82 loads the software code or instructions via a direct interface with the computer readable medium or via a wired and/or wireless network. Upon loading and executing such software code or instructions by the computing system 82, the computing system 82 may perform any of the functionality of the computing system 82 described herein, including any steps of the method 118 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for calibrating harvesters, the system comprising:

a harvester that discharges a flow of harvested crop material to a transport vehicle;

a yield sensor that detects the flow of crop material discharged from the harvester and outputs data indicative of a flow rate of the flow of crop material;

a wireless communication device that receives a transport vehicle communication from the transport vehicle, the transport vehicle communication including a weight of a crop material in a transport receptacle of the transport vehicle; and a computing system in data communication with the wireless communication device, the computing system determines a time rate of change of the weight of the crop material in the transport receptacle of the transport vehicle and further determines a yield sensor calibration update based on a time delay determination between the flow rate of the crop materials and the time rate of change of the weight, the computing system applying the yield sensor calibration update to adjust the data output from the yield sensor.

2. The system of claim 1, wherein the computing system smooths the weight of the crop material to produce a smoothed weight prior to the determination of the time rate of change of the weight.

3. The system of claim 2, wherein the computing system applies a low pass filter to the weight to produce the smoothed weight.

4. The system of claim 1, wherein the computing system receives an unload initiated command and further determines a yield sensor calibration value after receipt of the unload initiated command.

5. The system of claim 1, wherein the computing system monitors calibration quality data against a corresponding calibration quality check threshold.

6. The system of claim 5, wherein if the calibration quality data is outside the calibration quality check threshold, the yield sensor calibration update is rejected by the computing system and is not applied to adjust the data output from the yield sensor.

7. The system of claim 5, wherein the calibration quality check is at least one of: (1) uphill/downhill check; (2)

humidity check; (3) crop type check; (4) flow rate check; (5) stop and go frequency check; or (6) headland turn check.

8. The system of claim 1, wherein the computing system issues a stop calibration update after a predetermined calibration interval.

9. A harvesting system comprising:

a harvester that discharges a flow of harvested crop material through an unloading device to a transport vehicle;

a yield sensor provided in association with the harvester and in flow communication with the flow of harvested crop material, the yield sensor generates data indicative of a flow rate of the flow of harvested crop material discharged from the harvester;

a wireless communication device that receives a transport vehicle communication from the transport vehicle, the transport vehicle communication including a weight of a crop material in a transport receptacle of the transport vehicle; and a computing system in data communication with the wireless communication device;

wherein the computing system:

determines a time rate of change of weight based on the weight of the crop material;

determines a yield sensor calibration update based on a steady state time window associated with a steady state of the flow rate of the harvested crop material and the weight of the crop material in the transport receptacle, the steady state time window comprising a first steady state time window associated with the flow rate and a second steady state time window based on the time rate of change of weight:

determines the first steady state time window based on a comparison of the flow rate of the harvested crop material with a flow rate threshold;

determines the second steady state time window based on a comparison of the time rate of change of weight with a time rate of change of weight threshold; and applies the yield sensor calibration update that adjusts the data generated by the yield sensor.

10. The harvesting system of claim 9, wherein the first steady state time window includes a time shift relative to the second steady state time window.

11. The harvesting system of claim 10, wherein the time shift is a time delay determined by the computing system through comparison of the flow rate and the time rate of change of weight.

12. The harvesting system of claim 9, wherein the computing system numerically integrates the flow rate in producing a calculated weight.

13. The harvesting system of claim 12, wherein the yield sensor calibration update is based on the calculated weight and data based on the weight.

14. The harvesting system of claim 9, wherein the computing system updates a calibration value for the yield sensor with the yield sensor calibration update.

15. A method for calibrating harvesters, the method comprising:

operating a harvester to harvest crop material within a field;

unloading the harvested crop material from the harvester to a transport receptacle separate from the harvester;

receiving, with a computing system, flow rate data indicative of a flow rate of harvested crop material discharged from the harvester;

receiving, with the computing system, weight data indicative of a weight of the harvested crop material in the transport receptacle;

determining, with the computing system, a yield sensor calibration update based on data derived from a steady state time window associated with a steady state of the flow rate of the harvested crop material and a time rate of change of weight of the crop material in the transport receptacle;

determining the steady state time window of the flow rate of the harvested crop material and the time rate of change of weight of the crop material in the transport receptacle, wherein the steady state time window comprises a first steady state time window associated with the flow rate and a second steady state time window based on the time rate of change of weight;

determining the first steady state time window based on a comparison of the flow rate of the harvested crop material with a flow rate threshold;

determining the second steady state time window based on a comparison of the time rate of change of weight with a time rate of change of weight threshold; and applying, with the computing system, the yield sensor calibration update that adjusts the flow rate data.

16. The method of claim 15, wherein the first steady state time window includes a time shift relative to the second steady state time window.

17. The method of claim 16, wherein the time shift is a time delay determined by the computing system through comparison of the flow rate and the time rate of change of weight.

* * * * *